(12) United States Patent
Wang et al.

(10) Patent No.: US 10,944,134 B2
(45) Date of Patent: Mar. 9, 2021

(54) BATTERY

(71) Applicant: Ningde Amperex Technology Limited, Ningde (CN)

(72) Inventors: Jifei Wang, Ningde (CN); Sheng Cheng, Ningde (CN); Wei Liang, Ningde (CN); Peilei Yang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 245 days.

(21) Appl. No.: 16/201,850

(22) Filed: Nov. 27, 2018

(65) Prior Publication Data

US 2019/0356027 A1   Nov. 21, 2019

(30) Foreign Application Priority Data

May 18, 2018  (CN) .......................... 201810478530.5

(51) Int. Cl.
 *H01M 10/52*  (2006.01)
 *H01M 2/30*  (2006.01)
 *H01M 2/10*  (2006.01)

(52) U.S. Cl.
 CPC ......... *H01M 10/52* (2013.01); *H01M 2/1016* (2013.01); *H01M 2/30* (2013.01)

(58) Field of Classification Search
 CPC .... H01M 2/0275; H01M 2/08; H01M 2/1016; H01M 2/30; H01M 10/52
 USPC .......................................................... 429/57
 See application file for complete search history.

(56) References Cited

U.S. PATENT DOCUMENTS

| | | | |
|---|---|---|---|
| 2013/0202921 A1* | 8/2013 | Rizzi | C01B 3/0084 429/57 |
| 2014/0220405 A1* | 8/2014 | Damon | H01M 2/1077 429/120 |
| 2018/0040913 A1* | 2/2018 | Han | B32B 7/12 |
| 2018/0047960 A1* | 2/2018 | Yokoshima | H01M 10/0566 |

* cited by examiner

*Primary Examiner* — James M Erwin
(74) *Attorney, Agent, or Firm* — Hamre, Schumann, Mueller & Larson, P.C.

(57) ABSTRACT

A battery includes a casing having two first peripheral portions and two second peripheral portions, a cell disposed within the casing, two conductive tabs electrically connected to the cell and exposed from at least one of the first peripheral portions, and an absorbent. Each of the second peripheral portions has a sealed region that has a sealed edge adjacent to the cell. The sealed region of at least one of the second peripheral portions has an inner sealed section disposed adjacent to the sealed edge, an outer sealed section, and an isolating section disposed between the inner sealed section and the outer sealed section. The absorbent is received in the isolating section for absorbing moisture or gas.

14 Claims, 8 Drawing Sheets

BATTERY

CROSS-REFERENCE TO RELATED APPLICATION

This application claims priority of Chinese Patent Application No. 201810478530.5, filed on May 18, 2018, the content of which is incorporated herein by reference in its entirety.

FIELD

The disclosure relates to a battery, and more particularly to a soft package battery.

BACKGROUND

An existing soft package lithium battery is formed by sealing a cell within an aluminum-plastic composite film (as a casing). However, once there is breakage at sealed edges of the soft package lithium battery, electrolyte leakage from the battery might occur, leading to corrosion of a device which is equipped with the soft package lithium battery and causing safety issues as well. When the soft package lithium battery has been in use for more than ten years, gas produced either by long-term usage or by water seeping into the battery is likely to cause breakage at the sealed edges of the soft package lithium battery. Furthermore, a high voltage lithium battery with a voltage above 4.4V is also at risk of producing high volume of gas.

The current solutions to the production of high volume of gas are, for example, enclosing or doping electrodes of the battery cell, or adding additives to the electrolyte. However, such treatments might compromise other performances of the battery. In addition, improvements on the gas production issue may not be significant, as the above methods are limited by the characteristics of materials used in the battery cell, and material costs might be increased. As a result, how to effectively lower the risk resulting from gas production by simpler and cheaper manners is a problem to be solved.

SUMMARY

Therefore, an objective of the disclosure is to provide a battery that can alleviate at least one of the drawbacks of the prior art.

According to an aspect of the present disclosure, the battery includes a casing, a cell disposed within the casing, two conductive tabs electrically connected to the cell, and an absorbent. The casing has two opposite first peripheral portions and two opposite second peripheral portions connected to the two opposite first peripheral portions. The two conductive tabs are exposed from at least one of the first peripheral portions of the casing. Each of the second peripheral portions has a sealed region that has a sealed edge adjacent to the cell. The sealed region of at least one of the second peripheral portions has an inner sealed section disposed adjacent to the sealed edge, an outer sealed section disposed away from the sealed edge, and an isolating section disposed between the inner sealed section and the outer sealed section. The absorbent is received in the isolating section for absorbing moisture or gas.

According to another aspect of the present disclosure, the battery includes a casing, a cell disposed within the casing, two conductive tabs electrically connected to the cell, and an absorbent. The casing has two opposite first peripheral portions and two opposite second peripheral portions connected to the two opposite first peripheral portions. The two conductive tabs are exposed from at least one of the first peripheral portions of the casing. Each of the second peripheral portions has a sealed region. The sealed region of at least one of the second peripheral portions has an inner sealed section, an outer sealed section, and an isolating section disposed between the inner sealed section and the outer sealed section. The isolating section protrudes from the inner sealed section and the outer sealed section. The absorbent is received in the isolating section for absorbing moisture or gas.

DETAILED DESCRIPTION

Figure 1:
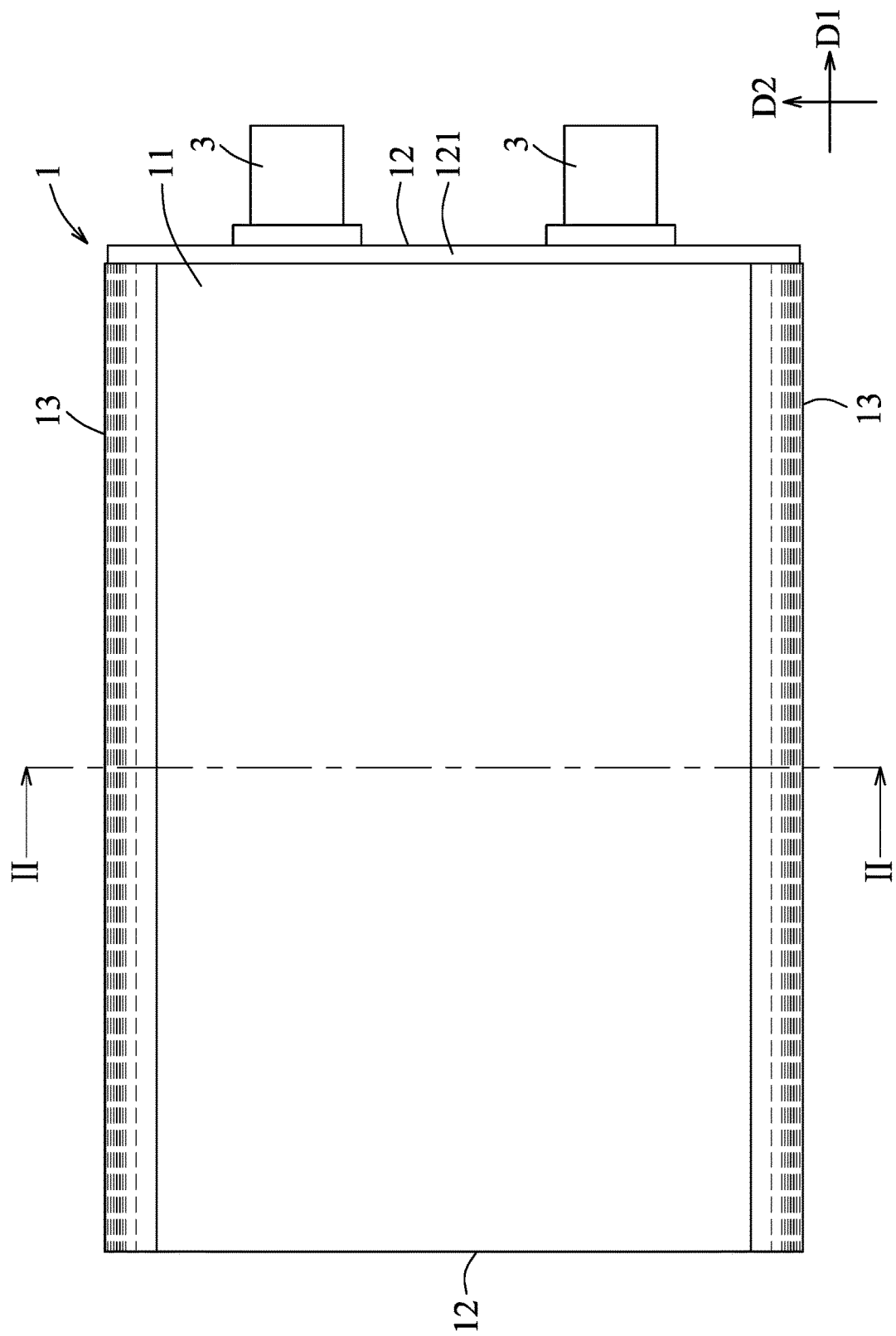
FIG. 1 is a top view of the first embodiment of a battery according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics. For the sake of clarity, the structures shown in figures might not be drawn to scale or proportion.

Figure 2:
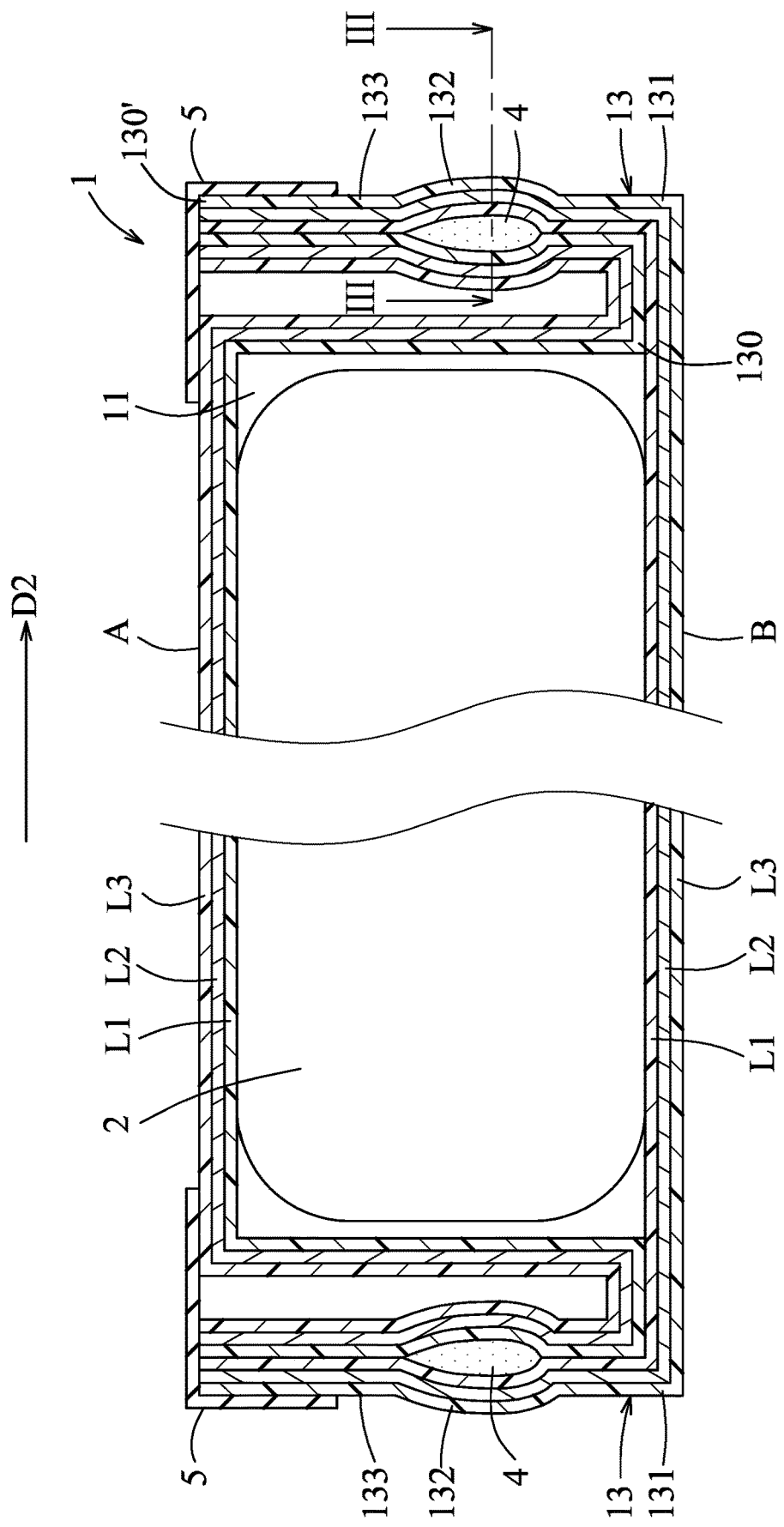
FIG. 2 is a fragmentary partly sectional view taken from a line II-II of FIG. 1.
Figure 3:
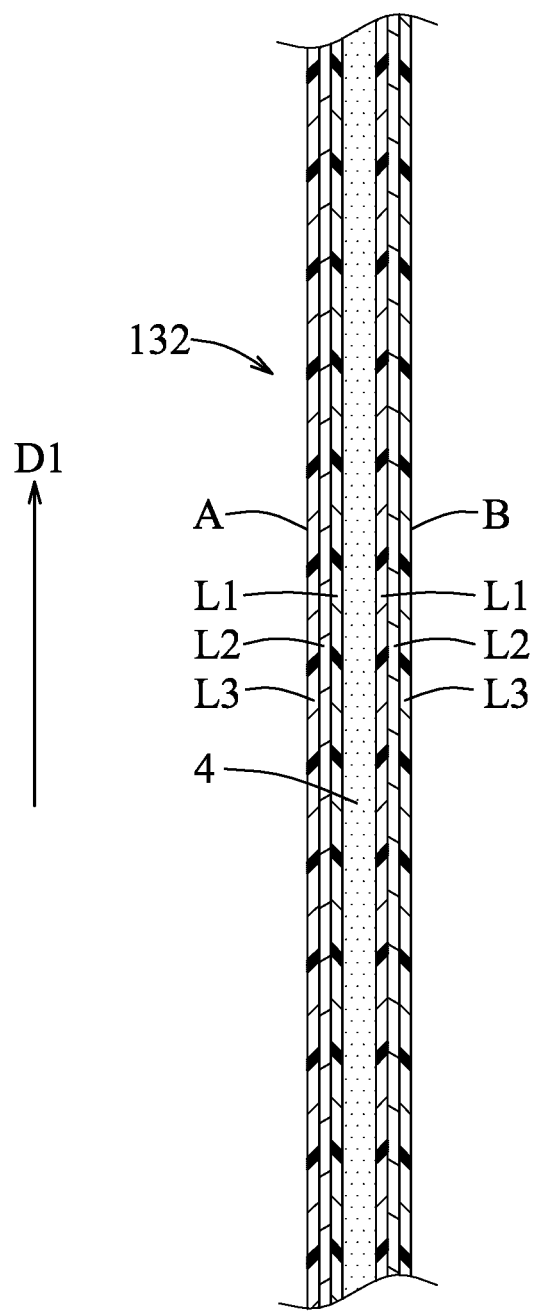
FIG. 3 is a fragmentary sectional view taken from a line III-III of FIG. 2.

Referring to FIGS. 1 to 3, the first embodiment of a battery according to the disclosure includes a casing 1, a cell 2 disposed within the casing 1, two conductive tabs 3 electrically connected to the cell 2 and exposed from the casing 1, and an absorbent 4. The casing 1 has a receiving space 11 in which the cell 2 is disposed, two opposite first peripheral portions 12, and two opposite second peripheral portions 13 connected to the two opposite first peripheral portions 12. The first peripheral portions 12 are opposite to each other in a first direction (D1), and the second peripheral portions 13 extend in the first direction (D1). The second peripheral portions 13 are opposite to each other in a second direction (D2), and the first peripheral portions 12 extend in the second direction (D2). The first direction (D1) and the second direction (D2) cross each other. The first direction (D1) is substantially perpendicular to the second direction (D2). The cell 2 includes an anode (not shown), a cathode (not shown) and a separator (not shown) disposed between the anode and the cathode, and is formed by rolling or stacking. The casing 1 is filled with an electrolyte (not shown). The cell 2, the conductive tabs 3, and the electrolyte can be made by existing techniques, which are not addressed in detail here. In the first embodiment, the two conductive tabs 3 are exposed from the same first peripheral portion 12. However, the two conductive tabs 3 may be exposed from the two opposite first peripheral portions 12 respectively as shown in the second embodiment. In other words, the two conductive tabs 3 can be exposed from at least one of the two opposite first peripheral portions 12 depending on actual requirements. Angles formed between the first peripheral portions 12 and the second peripheral portions 13 are corresponding to one angle of the cell 2, and the angles could be adjusted based on actual requirements. However, when the angles are too small, there is a higher risk that the sharp angles of the cell 2 might pierce apacking film of the battery. In practice, when the angles are too large, for facilitating packing of the battery, it is more advantageous to combine the first peripheral portion 12 and the peripheral portion 13 into one peripheral portion. The angles are designed to be larger than or equal to 30 degrees and smaller than or equal to 150 degrees. In certain embodiments, the angles are larger than or equal to 60 degrees and smaller than or equal to 120 degrees.

More specifically, the casing 1 includes an upper laminated film (A) and a lower laminated film (B) and is formed by sealing the upper laminated film (A) and the lower laminated film (B) at their peripheries. Each of the upper laminated film (A) and the lower laminated film (B) has an inner bonding layer (L1), an outer protection layer (L3) and a metal layer (L2) located between the inner bonding layer (L1) and the outer protection layer (L3). The upper laminated film (A) and the lower laminated film (B) are bonded together through the inner bonding layers (L1). In this embodiment, the inner bonding layers (L1) of the upper laminated film (A) and said lower laminated film (B) are bonded together at the second peripheral portions 13. The inner bonding layers (L1) can be bonded together by hot melt technique, and are made from a material such as polypropylene (PP). The metal layers (L2) serve to prevent moisture from entering the battery and to stop the electrolyte from leaking out of the battery, and are made of a material such as aluminum foil. The outer protection layers (L3) are made of a material with a higher melting point and better mechanical properties, such as nylon, so as to provide better strength to the casing 1.

In the first embodiment, the upper laminated film (A) and the lower laminated film (B) of the casing 1 are obtained by first folding a film (e.g., an aluminum-plastic composite film) to form a folded side and an open side opposite to the folded side. The folded side is one of the first peripheral portions 12 from which the conductive tabs 3 are not exposed, and the open side is the other of the first peripheral portions 12 from which the conductive tabs 3 are exposed. The upper laminated film (A) and the lower laminated film (B) are then bonded and sealed together at the open side so as to form a tab-packaging region 121 at the other of the first peripheral portions 12. The conductive tabs 3 are fixed in and exposed from the tab-packaging region 121. Finally, the upper laminated film (A) and the lower laminated film (B) are then bonded along the two second peripheral portions 13.

Each of the second peripheral portions 13 has a sealed region that has a sealed edge 130 adjacent to the cell 2. The sealed region of at least one of the second peripheral portions 13 has an inner sealed section 131 disposed adjacent to the sealed edge 130, an outer sealed section 133 disposed away from the sealed edge 130, and an isolating section 132 disposed between the inner sealed section 131 and the outer sealed section 133. According to other embodiments of the disclosure, the isolating section 132 may also protrude from the inner sealed section 131 and the outer sealed section 133. The absorbent 4 is received in the isolating section 132 for absorbing moisture or gas produced by the cell 2. In other words, the absorbent 4 is sandwiched between the inner bonding layer (L1) of the upper laminated film (A) and the inner bonding layer (L1) of the lower laminated film (B) at the isolating section 132. In this embodiment, the sealed region of each of the second peripheral portions 13 has the inner section 131, the isolating section 132, and the outer sealed section 133.

The absorbent 4 may include at least one of a desiccant for absorbing moisture or a gas absorbing material for absorbing gas produced by the cell 2. That is, the absorbent 4 may be made of a single material or a mixture of different materials. The proportion of the desiccant and the gas absorbing material are adjustable based on requirements or properties of the desiccant and the gas absorbing material. The desiccant and the absorbing material may have the same material. The material for the desiccant may be a material that is able to absorb and entrap water molecules, such as silica gel, molecular sieves, a carbonaceous material, mineral desiccant, etc. The material for the gas absorbing material may be a material with a large specific surface area (SSA) and suitable pore structure for absorbing gas produced by the cell 2, such as a carbonaceous absorbent, zeolites, a mesoporous material, etc. The desiccant may also absorb moisture entering from the outside into the outer sealed sections 133, and thus prevents moisture from further entering the cell 2 and affecting the performance of the cell 2. The gas absorbing material may absorb gas produced by the cell 2 when the inner sealed sections 131 is split due to the gas, and lower the risk of further rupture of the outer sealed section 133. Moreover, the absorbent 4 being disposed between the inner sealed sections 131 and the outer sealed sections 133, direct contact between the absorbent 4 and the electrolyte may be avoided so as to not adversely affect the performance of the cell 2.

In the first embodiment, the casing 1 is made according to the following steps. First, the upper laminated film (A) is processed to form a cavity which is to be formed into the receiving space 11 as the upper laminated film (A) is bonded to the lower laminated film (B). The cell 2 that is already connected to the two conductive tabs 3 is then disposed inside the cavity, and the upper laminated film (A) and the lower laminated film (B) are bonded together along the first peripheral portion 12 to form the tab-packaging region 121. Afterward, the upper laminated film (A) and the lower laminated film (B) are sealed off at one of the second peripheral portions 13 to form the inner sealed section 131 and to defined the receiving space 11, and the electrolyte is infused into the receiving space 11 from the other unsealed second peripheral section 13 to infiltrate the cell 2. After forming, degassing is then performed from the unsealed second peripheral section 13 to remove gas from the receiving space 11. After degassing, the unsealed second peripheral section 13 is sealed to form the inner sealed section 131, and any residual electrolyte outside the receiving space 11 is removed. Later, the absorbent 4 is disposed between the upper laminated film A and the lower laminated film B, right next to the two inner sealed sections 131, and then the upper laminated film A and the lower laminated film B are bonded again to form the two outer sealed sections 133, and thus to form the seal regions having the inner sealed sections 131, the isolating sections 132 and the outer sealed sections 133. The absorbent 4 are in the isolating sections 132 between the inner sealed sections 131 and the outer sealed sections 133. Finally, the sealed region of each of the two second peripheral portions 13 is folded to form a single-folded structure and is fixed using an insulating tape 5 to minimize the overall size of the casing 1.

In the present embodiments, the tab-packaging region 121 has a width in the first direction (D1) ranging from 1.5 mm to 12 mm, the inner sealed section 131 has a width from the sealed edge 130 to a boundary between the inner sealed section 131 and the isolating section 132 ranging from 0.5 mm to 3 mm, the isolating section 132 has a width from the boundary between the inner sealed section 131 and the isolating section 132 to a boundary between the isolating section 132 and the outer sealed section 133 ranging from 0.5 mm to 10 mm, and the outer sealed section 133 has a width from the boundary between the isolating section 132 and the outer sealed section 133 to another sealed edge 130' of the sealed region ranging from 2 mm to 15 mm. The width of the inner sealed section 131 is ¼ to ½ of the width of the tab-packaging region 121. The width of the inner sealed section 131 is ⅕ to ½ of the width of the outer sealed section 133. A compression ratio (referred to as the thickness change before and after bonding) of the tab-packaging region 121 ranges from 20% to 70%; a compression ratio of the inner sealed section 131 ranges from 3.5% to 30%; and a compression ratio of the outer sealed section 133 ranges from 20% to 75%.

In comparison to the tab-packaging region 121, the inner sealed section 131 has smaller width as well as compression ratio, and therefore has less seal strength. When the gas produced by cell 2 exceeds a certain amount which results in an increased pressure in the receiving space 11, the inner sealed section 131 will be ruptured first to release the pressure, and the gas in the receiving space 11 will be absorbed by the absorbent 4 in the isolating section 132. Thus, the breakage of the tab-packaging region 121 may be avoided. Furthermore, the outer sealed section 133 has a compression ratio that is higher than that of the inner sealed section 131 and that is comparable to that of the tab-packaging region 121. This indicates that the outer sealed section 133 has greater seal strength and is better at withstanding gas pressure. In other words, by disposing the absorbent 4 inside the isolating section 132 and having inner sealed section 131 with less seal strength than the tab-packaging region 121 and the outer sealed section 133, the risk of rupture and electrolyte leakage at the tab-packaging region 121 and the outer sealed section 133 could be greatly reduced.

Figure 4:
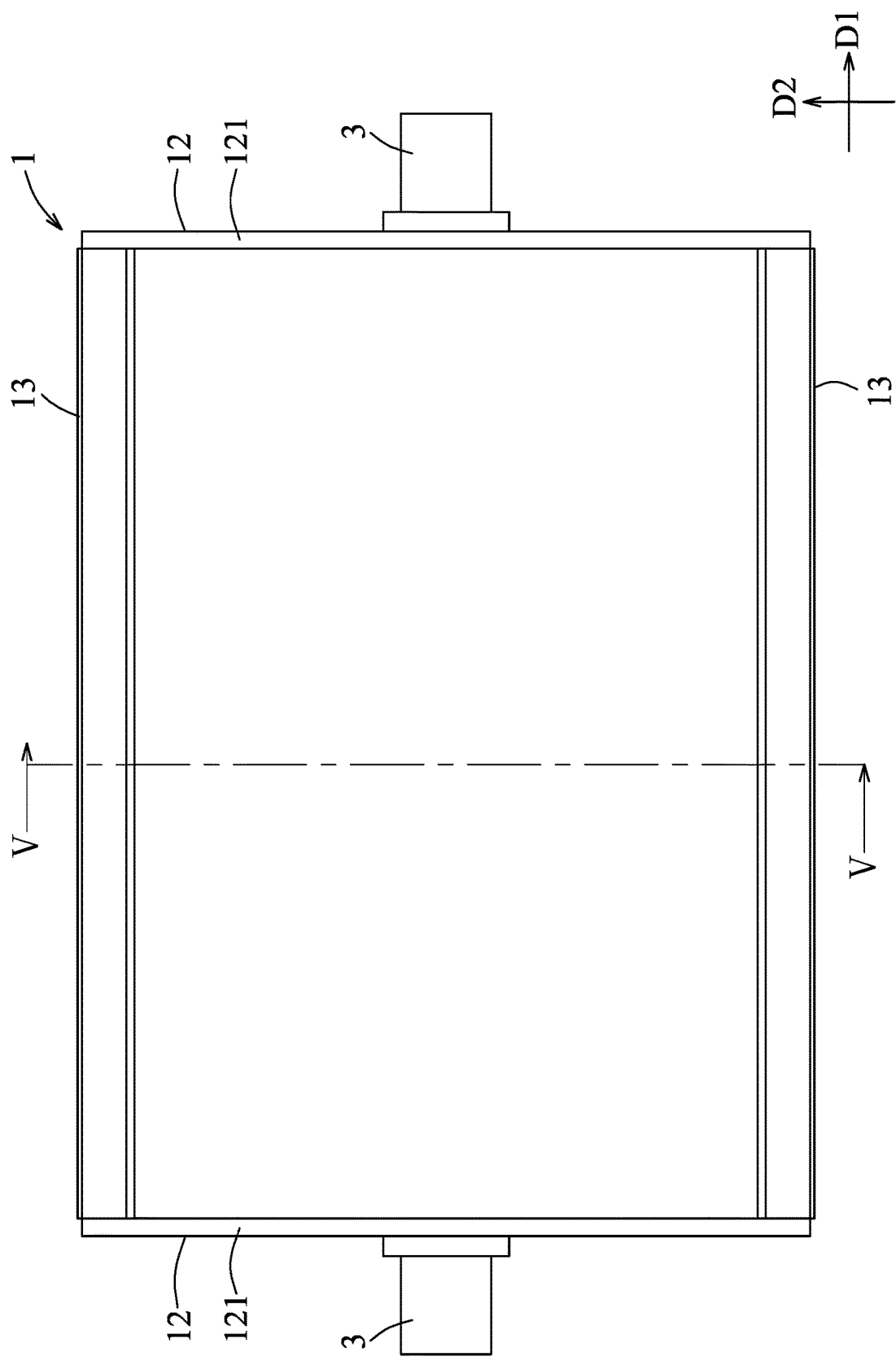
FIG. 4 is a top view of the second embodiment of the battery according to the disclosure.
Figure 5:
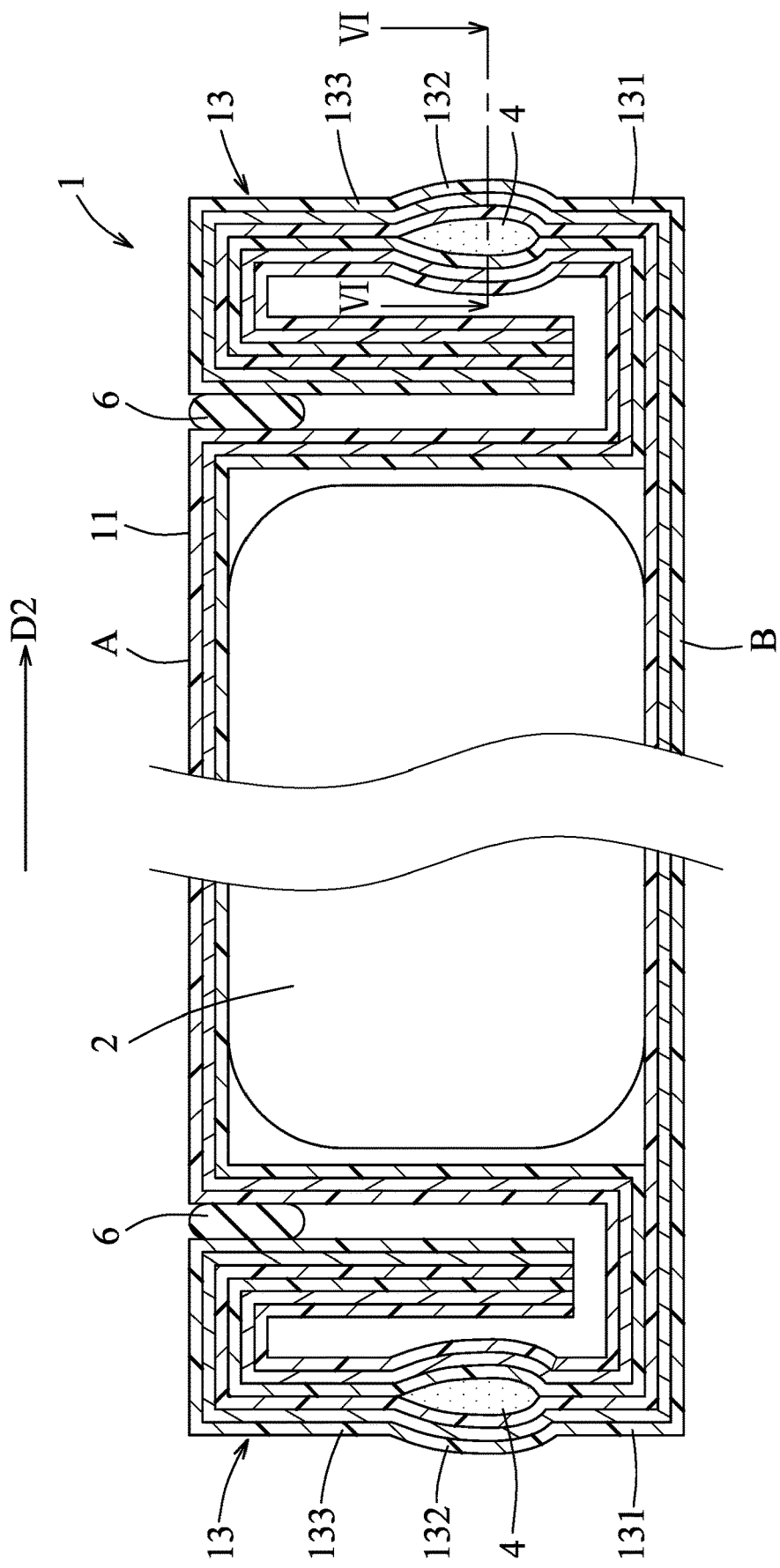
FIG. 5 is a fragmentary partly sectional view taken from a line V-V of FIG. 4.
Figure 6:
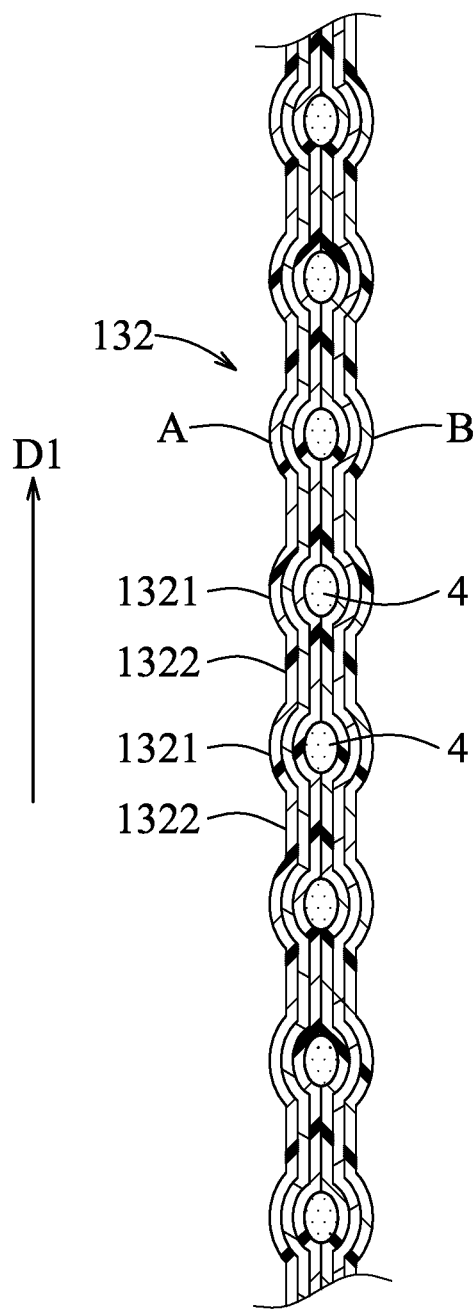
FIG. 6 is a fragmentary sectional view taken from a line VI-VI line of FIG. 5.

Referring to FIGS. 4 to 6, which illustrate a second embodiment of the battery according to this disclosure, the second embodiment is similar to the first embodiment and the differences therebetween lie in that, in the second embodiment, the upper laminated film (A) and the lower laminated film (B) are two separate films, and they are subjected to bonding procedure at, in addition to the second first peripheral portions 13, the two first peripheral portions 12 to form the tab-packaging region 121 at each first peripheral portion 12. The two conductive tabs 3 are fixed in and exposed from the two tab-packaging regions respectively. Furthermore, in the second embodiment, the isolating section 132 of the sealed region of each of the second peripheral portions 13 has a plurality of separated filling areas 1321 arranged in the first direction (D1) along the two second peripheral portions 13. More specifically, the isolating section 132 further includes a plurality of segregating areas 1322 (see FIG. 6) arranged in the first direction, and the filling areas 1321 are disposed between intervals of the segregating areas 1322 so that the filling areas 1321 are separated from each other by the segregating areas 1322. The absorbent 4 is filled and received in the filling areas 1321.

As shown in FIG. 5, in the second embodiment, the sealed region of each of the two second peripheral portions 13 are folded to form a double-layer folded structure and then glued to an exterior of a part of the upper laminated film (A) by a glue 6. How the folding of the sealed region (e.g., into the single-folded structure as shown in the first embodiment or the double-layer folded structure as shown in the second embodiment) is achieved may vary depending on actual requirements. In this embodiment, formation of the filling areas 1321 and the segregating areas 1322 makes the isolating section 132 more compact and sturdy, so that the absorbent 4 could be firmly received in the filling areas 1321 and the thicknesses of the isolating section 132 could be reduced. Therefore, the overall size of the casing 1 is reduced after the sealed regions of the second peripheral portions 13 are folded. Understandably, the isolating sections 132 of the first embodiment may also have the plurality of filling areas 1321 and the plurality of segregating areas 1322.

Figure 7:
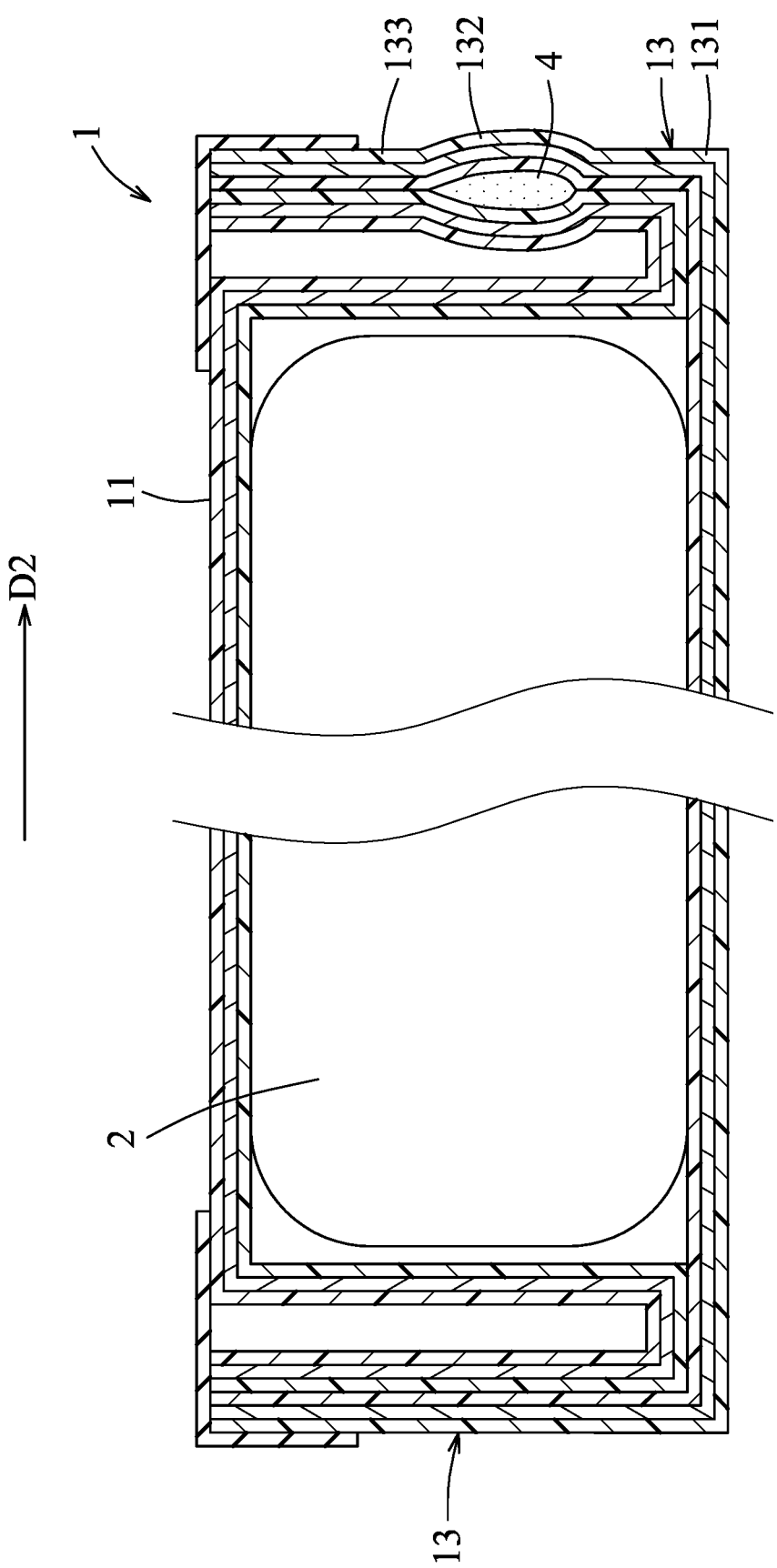
FIG. 7 is a fragmentary partly sectional view similar to FIG. 2, illustrating the third embodiment of the battery according to the disclosure.

Referring to FIG. 7, which illustrates a third embodiment of the battery according to this disclosure, the third embodiment is similar to the first embodiment and the difference therebetween lies in that the sealed region of only one of the second peripheral portions 13 has the inner sealed section 131, the isolating section 132 and the outer sealed section 133. The sealed region of the other second peripheral portion 13 is sealed in similar fashion as the tab-packaging region 121 (see FIG. 1) and has a similar seal strength as the tab-packaging region 121 and the outer sealed section 133. Thus, the absorbent 4 is disposed at only one of the second peripheral portions 13. The sealed region of the two second peripheral portions 13 are folded into the single-folded structure as shown in the first embodiment.

Figure 8:
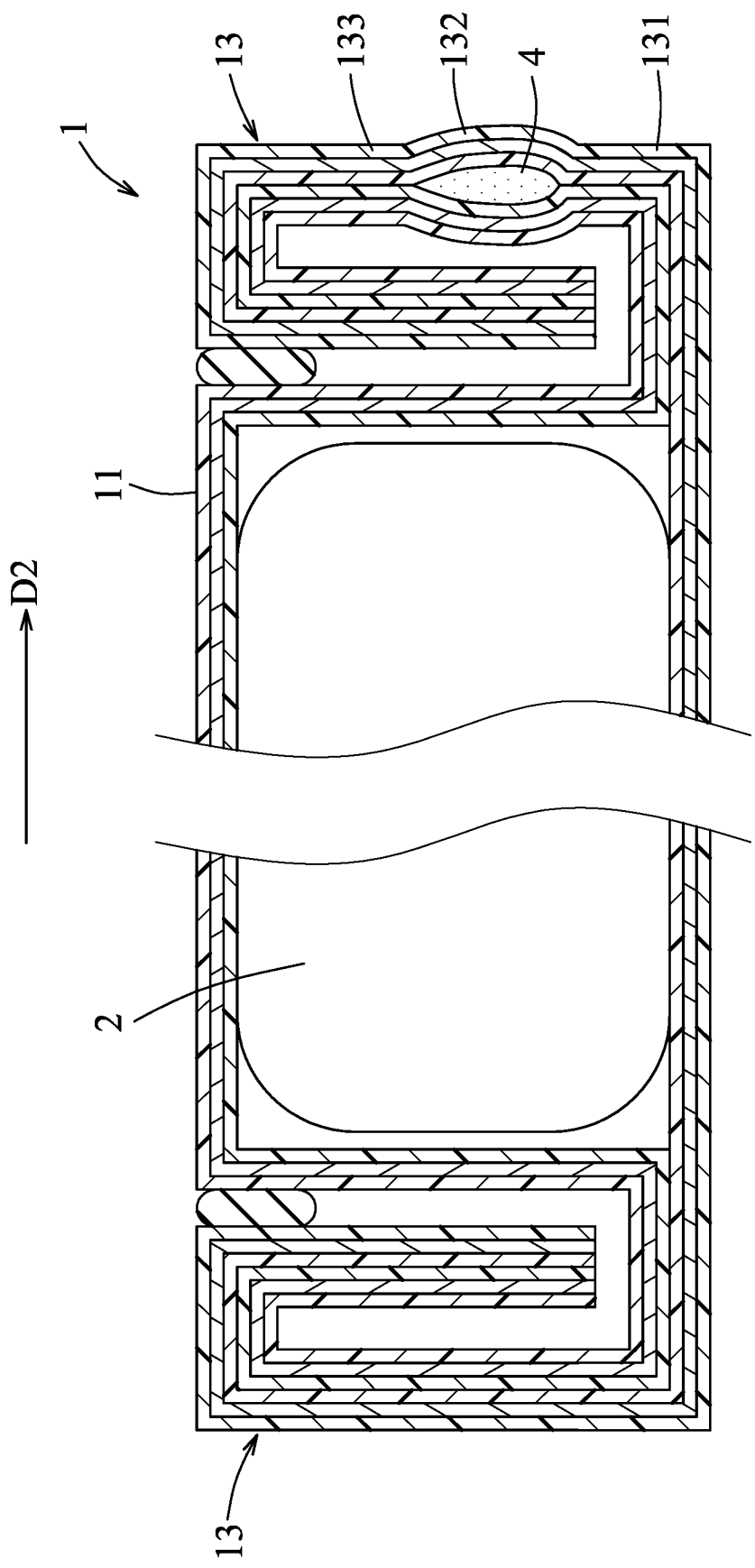
FIG. 8 is a fragmentary partly sectional view similar to FIG. 5, illustrating the fourth embodiment of the battery according to the disclosure.

Referring to FIG. 8, which illustrates the fourth embodiment of the battery according to this disclosure, the fourth embodiment is similar to the second embodiment and the difference therebetween lies in that the sealed region of only one of the second peripheral portions 13 has the inner sealed section 131, the isolating section 132 and the outer sealed section 133. The sealed region of the other second peripheral portion 13 is sealed in similar fashion as the tab-packaging region 121 (see FIG. 4) and has a similar seal strength as the tab-packaging region 121 and the outer sealed section 133 and is then folded twice to form a double-folded structure. The sealed region of the two second peripheral portions 13 are folded into the double-layer folded structure as shown in the second embodiment.

In view of the aforesaid, it is noted that whether the absorbent 4 is filled at only one or both of the sealed regions of the second peripheral portions 13 may be decided by the predetermined amount of gas produced by the cell 2. In addition, depending on requirements, the isolating sections 132 may be optionally formed with the filling areas 1321.

The following Experiments 1 and 2 are provided respectively to illustrate the effect of the absorbent disposed at the two second peripheral portions 13 on preventing external moisture from entering into a casing and preventing electrolyte leakage.

A casing without an absorbent disposed therein is used as a control group.

Experiment 1

In the present experiment, a 153 μm aluminum-plastic composite film was used to make a casing of a sample in each of an experimental group and a control group. The casing of the sample in the experimental group was filled with an absorbent in isolating sections of two second peripheral portions thereof (i.e., the casing had the structure as shown in the first embodiment). The sample in the control group had a structure similar to that of the experimental group except that no absorbent was used in the control group and the sealed regions of the second peripheral portions did not include the isolating sections. The absorbent in the isolating sections of the second peripheral portions in the experimental group was composed of 80% of a gas absorbing material and 20% of a desiccant. Silica gel was used as the desiccant, and 5 Å molecular sieves were used as the gas absorbing material. 21 samples were provided respectively for the experimental group and the control group. Parameters of the casings in the experimental group and the control group are shown in Table 1. Since corresponding parameters are the same between the two second peripheral portions of the casing for all samples, only parameters of one of the second peripheral portions are shown in Table 1. Moreover, 3 g of dimethyl carbonate (DMC) was sealed inside each sample, which was then stored under a condition of high temperature (65° C.) and high humidity (90% relative humidity). Every week, 7 samples of each group were taken to measure the amount of water in DMC sealed therein, and the results are shown in Table 2, in which the data for "Day 0" are the water content of DMC measured before DMC was sealed in the casings.

TABLE 1

| | Experimental group | Control group |
|---|---|---|
| | Width of the tab-packaging region: 4 mm | Width of the tab-packaging region: 4 mm |
| | Compression ratio of the tab-packaging region: 41.2-53.7% | Compression ratio of the tab-packaging region: 41.2-53.7% |
| Second peripheral portion | Width of the inner sealed section: 1.5 mm | Width of the sealed region of the second peripheral portion: 6 mm |
| | Compression ratio of the inner sealed section: 10-22.5% | |
| | Width of the outer sealed section: 4.5 mm | Compression ratio of the second peripheral portion: 41.2-53.7% |
| | Compression ratio of the outer sealed section: 41.2-53.7% | |
| | Width of the isolating section: 4 mm | |

TABLE 2

| | Amount of water in DMC (µg/g) | | | |
|---|---|---|---|---|
| | Day 0 | Day 7 | Day 14 | Day 21 |
| Experimental group | 43.6 | 98 | 177.6 | 210.8 |
| | 48.4 | 102.3 | 174.6 | 216.9 |
| | 43.6 | 106.4 | 178.9 | 219.7 |
| | | 95.6 | 183.2 | 209.4 |
| | | 87.4 | 180.1 | 205.3 |
| | | 94 | 170.2 | 209.5 |
| | | 101 | 170.1 | 215 |
| Control group | 43.6 | 135 | 238.7 | 345.2 |
| | 48.4 | 148.2 | 233.2 | 333.9 |
| | 43.6 | 139.1 | 233.4 | 342.5 |
| | | 140.9 | 232.7 | 324.2 |
| | | 149 | 224.5 | 341.5 |
| | | 124.8 | 230 | 346.9 |
| | | 132 | 237.7 | 310.2 |

According to Table 2, the samples in the experimental group, after being stored under the condition of high temperature and high humidity, has significantly lower water content in DMC in comparison to the samples in the control group. Therefore, it can be seen that the casings in the experimental group are capable of effectively reducing the amount of water entering the casing.

Experiment 2

In this experiment, casings in an experimental group and a control group had the same structures and parameters as those in the experimental group and the control group in Experiment 1. However, in this experiment, a cell and an electrolyte were sealed in the casing of each sample in the experimental group and the control group. 10 samples were provided for each group respectively, and were stored at 85° C. for 24 hours, after which the samples were checked for electrolyte leakage, and volume changes of the samples were measured by fluid displacement. The results are shown in Table 3.

TABLE 3

| | No. of sample | Increase of Volume | Leakage | Description |
|---|---|---|---|---|
| Experimental group | 1 | 14.20% | No | Breakage of TWO inner sealed sections |
| | 2 | 21.30% | No | Breakage of TWO inner sealed sections |
| | 3 | 20.50% | No | Breakage of TWO inner sealed sections |
| | 4 | 34.20% | No | Breakage of ONE inner sealed section |
| | 5 | 14.70% | No | Breakage of TWO inner sealed sections |
| | 6 | 16.60% | No | Breakage of TWO inner sealed sections |
| | 7 | 32.10% | No | Breakage of ONE inner sealed section |
| | 8 | 18.20% | No | Breakage of TWO inner sealed sections |
| | 9 | 31.40% | No | Breakage of ONE inner sealed section |
| | 10 | 16.70% | No | Breakage of TWO inner sealed sections |
| Control group | 1 | 85.2% | No | |
| | 2 | 92.3% | No | |
| | 3 | 78.8% | No | |
| | 4 | | Yes | Breakage of tab-packaging region |
| | 5 | 89.5% | No | |
| | 6 | 93.9% | No | |
| | 7 | | Yes | Breakage of the second peripheral portions |
| | 8 | 85.4% | No | |
| | 9 | | Yes | Breakage of the second peripheral portions |
| | 10 | 91.4% | No | |

According to Table 3, no electrolyte leakage is found in any of the ten samples in the experimental group. Three samples are found with breakages at two inner sealed sections of the two second peripheral portions, and seven samples are found with breakage at only one of the inner sealed sections. For the three samples with breakage at two inner sealed sections, an average increase in volume is approximately 32.57%, and for the seven samples with breakage at one inner sealed section, an average increase in volume is 17.46%. For the control group, three samples are found with electrolyte leakage, and seven samples, though no electrolyte leakage is found, have an average of 87.97% increase in volume. Therefore, it can be seen that the casings in the experimental group (which have the inner sealed sections 131, the outer sealed sections 133 and the isolating sections 132 with the absorbents 4 sealed therein) can indeed lower the risk of electrolyte leakage resulting from generated gas.

In conclusion, with the casing having the inner sealed section, the outer sealed section and the isolating section and with the absorbent sealed in the isolating section, the risk resulting from generated gas may be decreased. Furthermore, the amount of moisture entering the cell may be reduced which reduces negative effects on cell performance. At the same time, since the absorbent is sealed between the inner sealed section and the outer sealed section, direct contact between the absorbent and the electrolyte may be avoided, and thus the performances of the cell will not be adversely influenced. Moreover, the battery of this disclosure may be made using simpler process and with reduced cost.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A battery, comprising:
    a casing having two opposite first peripheral portions and two opposite second peripheral portions connected to said two opposite first peripheral portions;
    a cell disposed within said casing;
    two conductive tabs electrically connected to said cell and exposed from at least one of said two opposite first peripheral portions of said casing; and
    an absorbent;
    wherein each of said second peripheral portions has a sealed region that has a sealed edge adjacent to said cell, said sealed region of at least one of said second peripheral portions has an inner sealed section disposed adjacent to said sealed edge, an outer sealed section disposed away from said sealed edge, and an isolating section disposed between said inner sealed section and outer sealed section, and said absorbent is received in said isolating section for absorbing moisture or gas.

2. The battery of claim 1, wherein said first peripheral portions are opposite to each other in a first direction, said second peripheral portions extends in said first direction, said isolating section has a plurality of separated filling areas arranged in said first direction, and said absorbent is received in said plurality of separated filling areas.

3. The battery of claim 2, wherein said casing comprises an upper laminated film and a lower laminated film bonded to said upper laminated film, each of said upper laminated film and said lower laminated film includes an inner bonding layer, an outer protection layer, and a metal layer located between said inner bonding layer and said outer protection layer, and said inner bonding layers of said upper laminated film and said lower laminated film are bonded together at said second peripheral portions.

4. The battery of claim 3, wherein said at least one of said first peripheral portions comprises a tab-packaging region, and said conductive tabs is fixed in and exposed from said tab-packaging region;
    said tab-packaging region has a width in said first direction that is between 1.5 mm and 12 mm;
    said inner sealed section has a width from said sealed edge to a boundary between said inner sealed section and said isolating section that is between 0.5 mm and 3 mm;
    said isolated section has a width from said boundary between said inner sealed section and said isolating section to a boundary between said isolating section and said outer sealed section that is between 0.5 mm and 10 mm; and
    said outer sealed section has a width from said boundary between said isolating section and said outer sealed section to said sealed edge that is between 2 mm and 15 mm.

5. The battery of claim 3, wherein said inner bonding layer of said upper laminated film is bonded to said inner bonding layer of said lower laminated film by hot melt technique, a compression ratio of said tab-packaging region ranges from 20% to 70%, a compression ratio of said inner sealed section ranges from 3.5% to 30%, and a compression ratio of said outer sealed section ranges from 20% to 75%.

6. The battery of claim 1, wherein the width of said inner sealed section is ¼ to ½ of the width of said tab-packaging region, and the width of said inner sealed section is ⅕ to ½ of the width of said outer sealed section.

7. The battery of claim 1, wherein said absorbent comprises at least one of a desiccant for absorbing moisture or a gas absorbing material for absorbing gas produced by said cell.

8. A battery, comprising:
    a casing having two opposite first peripheral portions and two opposite second peripheral portions connected to said two opposite first peripheral portions;
    a cell disposed within said casing;
    two conductive tabs electrically connected to said cell and exposed from at least one of said two opposite first peripheral portions of said casing; and
    an absorbent;
    wherein each of said second peripheral portions has a sealed region, said sealed region of at least one of said second peripheral portions has an inner sealed section, an outer sealed section, and an isolating section disposed between said inner sealed section and said outer sealed section, and said isolating section protrudes from said inner sealed section and outer sealed section, and said absorbent is received in said isolating section for absorbing moisture or gas.

9. The battery of claim 8, wherein said first peripheral portions are opposite to each other in a first direction, said second peripheral portions extends in said first direction, said isolating section has a plurality of separated filling areas arranged in said first direction, and said absorbent is received in said plurality of separated filling areas.

10. The battery of claim 9, wherein said at least one of said first peripheral portions comprises a tab-packaging region, and said conductive tabs is fixed in and exposed from said tab-packaging region;

said tab-packaging region has a width in said first direction that is between 1.5 mm and 12 mm;
said inner sealed section has a width from said sealed edge to a boundary between said inner sealed section and said isolating section that is between 0.5 mm and 3 mm;
said isolated section has a width from said boundary between said inner sealed section and said isolating section to a boundary between said isolating section and said outer sealed section that is between 0.5 mm and 10 mm; and
said outer sealed section has a width from said boundary between said isolating section and said outer sealed section to said sealed edge that is between 2 mm and 15 mm.

11. The battery of claim 9, wherein said casing comprises an upper laminated film and a lower laminated film bonded to said upper laminated film, each of said upper laminated film and said lower laminated film includes an inner bonding layer, an outer protection layer, and a metal layer located between said inner bonding layer and said outer protection layer, and said inner bonding layers of said upper laminated film and said lower laminated film are bonded together at said second peripheral portions.

12. The battery of claim 11, wherein said inner bonding layer of said upper laminated film is bonded to said inner bonding layer of said lower laminated film by hot melt technique, a compression ratio of said tab-packaging region ranges from 20% to 70%, a compression ratio of said inner sealed section ranges from 3.5% to 30%, and a compression ratio of said outer sealed section ranges from 20% to 75%.

13. The battery of claim 8, wherein the width of said inner sealed section is ¼ to ½ of the width of said tab-packaging region, and the width of said inner sealed section is ⅕ to ½ of the width of said outer sealed section.

14. The battery of claim 8, wherein said absorbent comprises at least one of a desiccant for absorbing moisture or a gas absorbing material for absorbing gas produced by said cell.

* * * * *